United States Patent Office 2,808,365
Patented Oct. 1, 1957

2,808,365

PETROLEUM REFINING

James L. Jezl, Swarthmore, Pa., assignor to Sun Oil Company, Philadelphia, Pa., a corporation of New Jersey No Drawing. Application February 7, 1955,
Serial No. 486,727

7 Claims.  (Cl. 196—32)

This invention relates to the refining of petroleum and more particularly to refining processes involving the use of an epoxide reagent.

It is known in the art to convert mercaptan compounds contained in petroleum by contact of the petroleum with an epoxide in the presence of a liquid alkaline material, for example aqueous caustic soda. Such contacting is subject to certain disadvantages, however, such as the necessity for special mixing and separating equipment for the respective liquid phases, phase separation problems, etc.

According to the present invention, the disadvantages of prior art operation are overcome, and a highly effective means of converting mercaptans is provided. It is believed that the present invention provides a given reduction in mercaptan content with smaller amounts of epoxide than the required in prior art operation.

In one embodiment of the process according to the invention, a petroleum fraction containing mercaptans and to which an epoxide has been added is percolated in liquid phase through a bed of solid particles containing alkaline material, e. g. alkali metal hydroxide or carbonate, alkaline earth metal hydroxide or carbonate, etc. The space rate is preferably not greater than 10 milliliters of charge per minute per 100 grams of solid particles, since greater reductions in mercaptan content are obtained at lower space rates; however, higher space rates can be used in some instances. Generally, the space rate will not be lower than 0.1 milliliter of charge per minute per 100 grams of solid particles.

The mechanism of the mercaptan content reduction is believed to involve reaction of the epoxide with mercaptans. Thus, for example, ethylene oxide may react with a mercaptan, RSH, to form a hydroxythioether,

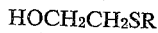
HOCH$_2$CH$_2$SR

The latter may become adsorbed by the solid particles, but is to a large extent washed out of the bed by the charge. The effluent thus contains substantial amounts of reaction products as described. However, these reaction products are for the most part unobjectionable and are in any event less objectionable, for example in odor, than the original mercaptans. In the case where a low molecular weight epoxide such as ethylene oxide has been employed, the products may be removable from the petroleum hydrocarbons by water washing.

Other types of constituents than mercaptans may also react with the epoxide, e. g. hydrogen sulfide, phenols, nitrogen bases, carboxylic acids, and the reaction products are to a large extent contained in the effluent. The reaction products are generally less objectionable materials than the original material prior to reaction with the epoxide.

The alkaline material in the solid particles is believed to exert a catalytic effect on the reaction between the epoxide and constituents of the charge. The alkaline material is not consumed, though there may be an intermediate reaction of mercaptans, for example, with the alkaline material to form mercaptides, followed by reaction of the mercaptides with the epoxide to form the alkaline material again and the thioether type of reaction product.

In another embodiment of the invention, a petroleum fraction containing mercaptans can be percolated through the bed of solid particles in the absence of epoxide. Mercaptides are formed and retained by the solid particles. Periodically, the flow of charge is discontinued, and a hydrocarbon liquid containing added epoxide and free of organic constituents reactive with alkaline material is percolated through the bed. The epoxide reacts with the mercaptides to regenerate the alkaline material and form thioethers which are largely carried out by the effluent hydrocarbon liquid.

The process of the invention is applicable generally to petroleum materials. The charge material is in a fluid state when contacted with the solid treating agent, and is preferably in the liquid state. Suitable charge materials include natural gas, refinery gas, dry gas, liquefied petroleum gases, gasoline, kerosene, mineral spirits, gas oil, furnace oil, stove oil, diesel fuel, jet fuel, lubricating oil, transformer oil, etc. Straight run or thermally or catalytically cracked or otherwise converted fractions can be treated.

Preferably, the contacting, and regenerating if any, are performed at approximately room temperature, but higher or lower temperatures can be employed if desired. Usually, temperatures above 300° F. are not employed, since the expense of employing a higher temperature is not warranted. Preferably, the pressure employed is approximately atmospheric, though higher or lower pressures can be employed if desired. For example, elevated pressure may be employed to maintain a volatile charge material in liquid phase. Usually pressures above about 100 p. s. i. g. are not warranted.

The amount of epoxide employed depends on the amount of materials reactive therewith which are to be converted. A useful yardstick is the number of milligrams of mercaptan sulfur contained in one liter of charge. Thus, in the subsequent example, the charge contained 23.7 mg. (0.00074 mole) of mercaptan sulfur per liter of charge. The amount of propylene oxide used was 0.02 ml. (0.0166 gram, 0.000286 mole) per 100 ml. of charge. Thus, the mole ratio of epoxide to mercaptan sulfur was about 3.86. Preferably, the mole ratio of epoxide to mercaptan sulfur employed according to the invention is within the approximate range from 0.5 to 10, more preferably 1.25 to 5. In the case where the epoxide is contacted with the solid material as a separate operation from the contacting of charge with the solid material, the ratio of epoxide to mercaptan sulfur can be figured on a rate basis. Thus, if one liter per hour of a charge containing 23.7 mg. of mercaptan sulfur per liter is percolated through a bed, and subsequently one liter per hour of pure hydrocarbon to which 0.02 volume percent of propylene oxide has been added is percolated through the bed, the mole ratio of epoxide to mercaptan sulfur is again about 3.86.

The reactions involved in the method of the invention may require the presence of small amounts of water in order to proceed with satisfactory rapidity. However water is not consumed in the reaction, and generally it is satisfactory to employ a solid alkaline material which contains small amounts of water without adding any other water to the system. Substantially anhydrous petroleum fractions can be treated with such a solid alkaline material; however it is also satisfactory to treat petroleum fractions containing small amounts of dissolved or suspended water, in which case the presence of water in the solid alkaline material may be unnecessary.

The solid alkaline material which is employed according to the invention is prepared by contacting aqueous alkali metal hydroxide, e. g. sodium hydroxide, potassium hydroxide, etc., and calcium carbonate in proportions such that the water in the aqueous alkali metal hydroxide is absorbed by solid constituents of the mixture to produce a single phase solid material containing an amount of metal hydroxide effective to catalyze conversion of mercaptans by the epoxide employed.

The epoxide employed according to the invention is one having the formula

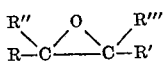

where R is selected from the group consisting of hydrogen, halogen radicals, hydrocarbon radicals having 1 to 5 carbon atoms, preferably 1 to 3 carbon atoms, alkoxyalkyl radicals having 2 to 10 carbon atoms, phenoxyalkyl radicals having 7 to 10 carbon atoms, and

and where R′, R″, and R‴ are each selected from the group consisting of hydrogen, hydrocarbon radicals having 1 to 5 carbon atoms, preferably 1 to 3 carbon atoms, and halogen atoms. More preferred epoxides are those having the formula

where R is selected from the group consisting of hydrogen and methyl and ethyl radicals.

The following example illustrates the invention:

1,2-propylene oxide was added to a straight run gasoline containing 23.7 mg. of mercaptan sulfur per liter of gasoline, as determined by titration with a standard solution containing silver ions, thereby to form a 0.02 volume percent solution. A solid alkaline material was prepared by mixing together 20 ml. of 50° Bé. caustic soda and 100 grams of calcium carbonate. The resulting mixture contained no separate water phase, the water in the caustic soda having been taken up by the calcium carbonate. 100 grams of the solid alkaline material thus obtained was employed to form a bed through which the gasoline was percolated at atmospheric temperature and pressure at a rate of 50 ml. per hour. The mercaptan sulfur content of various effluent fractions was determined.

For comparison, a similar run was performed wherein the gasoline contained no propylene oxide. The following table shows the results obtained, "PO" indicating the run employing propylene oxide, and "No PO" indicating the comparison run:

| Effluent Fraction | Mercaptan Sulfur Content mg./l | | |
|---|---|---|---|
| | Charge | Effluent (No PO) | Effluent (PO) |
| First 200 ml | 23.7 | 4.8 | 0.32 |
| Next 100 ml | 23.7 | 6.0 | 1.0 |
| Next 200 ml | 23.7 | 2.6 | 0.6 |
| Next 100 ml | 23.7 | | |
| Next 100 ml | 23.7 | 4.1 | 0.77 |
| Last 100 ml | 23.7 | 4.7 | 0.64 |

This example shows that a very large reduction in mercaptan content can be effected by percolating gasoline containing propylene oxide through a bed of solid particles containing alkaline material, and that the presence of propylene oxide substantially improves the reduction.

In a case where a 15% aqueous solution of caustic soda was employed, as contrasted with the solid alkaline material of this example, a 65% reduction in mercaptan content was obtained, as compared with the greater than 95% reduction in mercaptan content obtained in this example.

The invention claimed is:

1. Method for refining petroleum which comprises: contacting a petroleum fraction containing mercaptans with an epoxide compound having the formula:

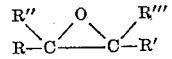

where R is selected from the group consisting of hydrogen, halogen radicals, hydrocarbon radicals having 1 to 5 carbon atoms, alkoxyalkyl radicals having 2 to 10 carbon atoms, phenoxyalkyl radicals having 7 to 10 carbon atoms, and

radicals, and where R′, R″, and R‴ are each selected from the group consisting of hydrogen, hydrocarbon radicals having 1 to 5 carbon atoms, and halogen radicals, said contacting being performed in the presence of a solid alkaline material prepared by contacting aqueous alkali metal hydroxide and calcium carbonate in proportions such that the water in the aqueous alkali metal hydroxide is absorbed by solid constituents of the mixture to produce a single phase solid material containing an amount of metal hydroxide effective to catalyze conversion of mercaptans by said epoxide, thereby to obtain superior conversion of mercaptans to that obtained by contacting with said epoxide under similar conditions in the presence of a liquid treating agent consisting of aqueous alkali metal hydroxide.

2. Method for refining petroleum which comprises: passing a petroleum fraction containing mercaptans and an epoxide compound having the formula

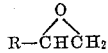

where R is selected from the group consisting of hydrogen, methyl, and ethyl radicals, in liquid phase through a bed of solid particles, the mole ratio of epoxide to mercaptan sulfur being within the approximate range from 0.5 to 10, and the flow rate being within the approximate range from 0.1 to 10 ml. of said fraction per minute per 100 grams of said solid particles, said particles being prepared by contacting aqueous alkali metal hydroxide and calcium carbonate in proportions such that the water in the aqueous alkali metal hydroxide is absorbed by solid constituents of the mixture to produce a single phase solid material containing an amount of metal hydroxide effective to catalyze conversion of mercaptans by said epoxide, thereby to obtain superior conversion of mercaptans to that obtained by contacting with said epoxide under similar conditions in the presence of a liquid treating agent consisting of aqueous alkali metal hydroxide.

3. Method for refining petroleum which comprises: contacting a petroleum fraction containing mercaptan with a solid alkaline material and subsequently contacting the solid alkaline material in the presence of hydrocarbon liquid with an epoxide compound having the formula:

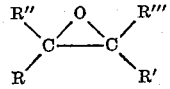

where R is selected from the group consisting of hydrogen, halogen radicals, hydrocarbon radicals having 1 to 5 carbon atoms, alkoxyalkyl radicals having 2 to 10 carbon atoms, phenoxyalkyl radicals having 7 to 10 carbon atoms, and

radicals, and where R′, R″, and R‴ are each selected from the group consisting of hydrogen, hydrocarbon radicals having 1 to 5 carbon atoms, and halogen radicals, said solid alkaline material being prepared by contacting aqueous alkali metal hydroxide and calcium carbonate in proportions such that the water in the aqueous alkali metal hydroxide is absorbed by solid constituents of the mixture to produce a single phase solid material containing an amount of metal hydroxide effective to catalyze conversion of mercaptans by said epoxide, thereby to obtain superior conversion of mercaptans to that obtained by contacting with said epoxide under similar conditions in the presence of a liquid treating agent consisting of aqueous alkali metal hydroxide.

4. Method for refining petroleum which comprises: contacting compounds selected from the group consisting of mercaptans occurring in petroleum and reaction products of said mercaptans with alkaline material, with a solid alkaline material in the presence of hydrocarbon liquid and in the presence of an epoxide compound having the formula:

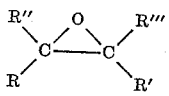

where R is selected from the group consisting of hydrogen, halogen radicals, hydrocarbon radicals having 1 to 5 carbon atoms, alkoxyalkyl radicals having 2 to 10 carbon atoms, phenoxyalkyl radicals having 7 to 10 carbon atoms, and

radicals, and where R′, R″ and R‴ are each selected from the group consisting of hydrogen, hydrocarbon radicals having 1 to 5 carbon atoms, and halogen radicals, said solid alkaline material being prepared by contacting aqueous alkali metal hydroxide and calcium carbonate in proportions such that the water in the aqueous alkali metal hydroxide is absorbed by solid constituents of the mixture to produce a single phase solid material containing an amount of metal hydroxide effective to catalyze conversion of mercaptans by said epoxide, thereby to obtain superior conversion of mercaptans to that obtained by contacting with said epoxide under similar conditions in the presence of a liquid treating agent consisting of aqueous alkali metal hydroxide.

5. Method according to claim 4 wherein the mole ratio of said epoxide to mercaptan sulfur in said petroleum fraction is not substantially greater than 5, and wherein said solid alkaline material is prepared by contacting approximately 50° Bé. sodium hydroxide with calcium carbonate in the ratio of about 20 ml. of aqueous sodium hydroxide per 100 grams of calcium carbonate.

6. Method according to claim 4 wherein said alkali metal hydroxide is sodium hydroxide.

7. Method according to claim 4 wherein said alkali metal hydroxide is potassium hydroxide.

References Cited in the file of this patent

UNITED STATES PATENTS

| | | |
|---|---|---|
| 2,028,335 | Kalishevsky | Jan. 21, 1936 |
| 2,575,989 | Arundale et al. | Nov. 20, 1951 |

OTHER REFERENCES

Glossary of terms used in petroleum refining, published by "American Petroleum Institute," division of refining, New York, N. Y., 1955, page 22.